United States Patent Office 2,777,850
Patented Jan. 15, 1957

2,777,850

4-ETHANESULFONYL-4-ARYL-1-METHYLPIPERIDINES AND THEIR PREPARATION

Sydney Archer, Albany, N. Y., assignor to Sterling Drug Inc., New York, N. Y., a corporation of Delaware No Drawing. Application February 16, 1953,
Serial No. 337,231

10 Claims. (Cl. 260—293.4)

This invention relates to new organic sulfones and to their preparation. These new sulfones are 4-ethanesulfonyl-4-aryl-1-methylpiperidines and their acid addition salts.

The compounds of this invention have been found to possess useful pharmacological properties, such as analgesic activity.

The basic 4-ethanesulfonyl-4-aryl-1-methylpiperidines have the formula

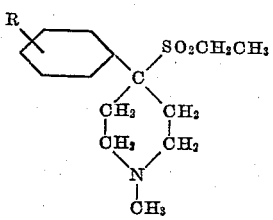

where R is H or methoxy. R when methoxy can be at any one of the three positions of the phenyl nucleus.

The basic sulfones of my invention were prepared according to the procedure represented as follows:

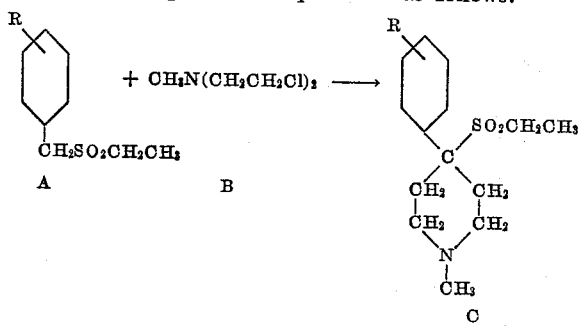

where the designation R has the same meaning given above. Thus, in this procedure an ethyl benzyl sulfone (A) is heated with N,N-bis(beta-chloroethyl)-N-methylamine (B) in the presence of a strongly basic condensing agent, such as sodium amide, sodium hydride, phenyllithium, or the like, to yield the basic sulfone (C). An illustration of this procedure is the formation of 4-ethanesulfonyl-4-(meta-methoxyphenyl)-1-methylpiperidine by heating ethyl meta-methoxybenzyl sulfone with N,N-bis(beta-chloroethyl)-N-methylamine in the presence of sodium amide.

In practicing my invention I preferred to use sodium amide as the strongly basic condensing agent because of its availability and low cost. Toluene is the preferred reaction medium; however, other solvents such as benzene, xylene or other suitably volatile liquid inert hydrocarbons will suggest themselves to those skilled in the art.

The acid addition salts of the instant invention are prepared by treating the foregoing described 4-ethanesulfonyl-4-aryl-1-methylpiperidines with the appropriate acid. In practicing my invention I found it convenient to employ the hydrochloride salt. However, other salts are within the scope of the invention. Included among other salts which may be used are the following, formed by reacting the basic sulfone compound with appropriate relatively non-toxic inorganic or organic acid: the hydrobromide, hydroiodide, phosphate, sulfate, sulfamate, ethanesulfonate, tartrate, citrate, succinate, acetate, benzoate, oleate, and the like.

The following examples will further illustrate specific embodiments of my invention.

EXAMPLE 1

*4-ethanesulfonyl-4-(para-methoxyphenyl) - 1 - methylpiperidine.*—To a stirred suspension of 53.6 g. of ethyl para-methoxybenzyl sulfone and 30.0 g. of sodium amide in 375 ml. of toluene there was added in portions 48 g. of N,N-bis(beta-chloroethyl)-N-methylamine hydrochloride in the course of thirty minutes. The amine hydrochloride was immediately converted into N,N-bis(beta-chloroethyl)-N-methylamine, which was then available for reaction with ethyl para-methoxybenzyl sulfone. The mixture was refluxed for five hours, cooled and treated with ethanol to destroy excess sodium amide. The toluene solution was washed with water and then three 100 ml. portions of 10% hydrochloric acid. The combined acid extracts were made basic. The semicrystalline solid that separated was dissolved in benzene and the solution dried by azeotropic distillation. The hot benzene solution was diluted with ligroin. The bulk of the solution was decanted from a small amount of oil that separated. This solid was recrystallized twice from benzene-n-hexane, thereby yielding 4-ethanesulfonyl-4-(para-methoxyphenyl)-1-methylpiperidine, M. P. 165–167.5° C.

The hydrochloride was prepared by dissolving the basic sulfone in excess ethanolic hydrogen chloride with warming, adding ether to the warm solution and allowing to cool. The resulting precipitate was recrystallized from absolute ethanol-absolute ether, yielding 4-ethanesulfonyl-4-(para-methoxyphenyl)-1 - methylpiperidine hydrochloride, M. P. 220.6–221.3° C. (cor.).

*Anal.*—Calcd. for $C_{15}H_{23}NO_3S \cdot HCl$: C, 53.97; H, 7.25; N, 4.20. Found: C, 53.67; H, 7.10; N, 4.41.

4 - ethane sulfonyl-4-(para-methoxyphenyl)-1-methylpiperidine hydrochloride was found to have analgesic activity when evaluated by the rat thermal radiation test [J. Pharmacol. Exptl. Therap. 84, 301 (1945)].

EXAMPLE 2

*4-ethanesulfonyl-4-phenyl-1-methylpiperidine.* — When the procedure described in Example 1 is followed but using 18.2 g. of benzyl ethyl sulfone, 12.0 g. of sodium amide, 12.0 g. of N,N-bis(beta-chloroethyl)-N-methylamine hydrochloride and 150 ml. of toluene, there is obtained 4 - ethanesulfonyl-4-phenyl-1-methylpiperidine, M. P. 142–144° C. after recrystallization from benzene-ligroin.

*Anal.*—Calcd. for $C_{14}H_{21}NO_2S$: C, 62.88; H, 7.92. Found: C, 63.33; H, 7.96.

4-ethanesulfonyl-4-phenyl-1 - methylpiperidine hydrochloride, prepared by treating an ethanol-ether solution of the basic sulfone with gaseous hydrogen chloride, melted at 201–202° C. (cor.) when recrystallized from isopropanol.

*Anal.*—Calcd. for $C_{14}H_{21}NO_2S \cdot HCl$: C, 55.34; H, 7.30; Cl, 11.67. Found: C, 55.46; H, 7.14; Cl, 11.59.

4-ethanesulfonyl-4-phenyl-1-methylpiperidine hydrochloride was found to have analgesic activity when tested as noted above.

I claim:

1. A member of the group consisting of a basic sulfone having the formula

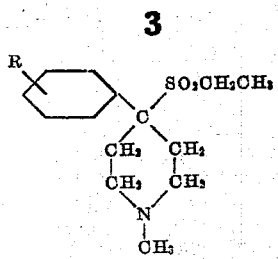

where R is a member of the group consisting of H and methoxy, and acid addition salts thereof.

2. A 4-ethanesulfonyl-4-(methoxyphenyl)-1-methylpiperidine having the formula

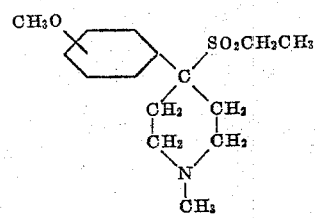

3. 4-ethanesulfonyl-4-(para-methoxyphenyl)-1-methylpiperidine.
4. 4-ethanesulfonyl-4-(para-methoxyphenyl)-1-methylpiperidine hydrochloride.
5. 4-ethanesulfonyl-4-phenyl-1-methylpiperidine.
6. 4-ethanesulfonyl-4-phenyl-1-methylpiperidine hydrochloride.
7. A process for the preparation of a basic sulfone having the formula

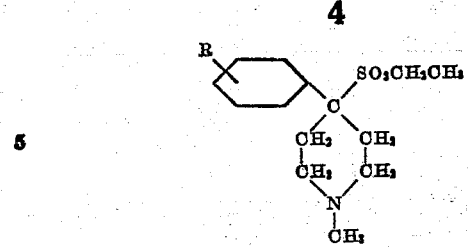

where R is a member of the group consisting of H and methoxy, which comprises heating an ethyl benzyl sulfone of the formula R—$C_6H_4CH_2SO_2CH_2CH_3$ with N,N-bis(beta-chloroethyl)-N-methylamine in the presence of a strongly basic condensing agent.

8. A process for the preparation of a 4-ethanesulfonyl-4-(methoxyphenyl)-1-methylpiperidine which comprises heating an ethyl methoxy benzyl sulfone with N,N-bis(beta-chloroethyl)-N-methylamine in the presence of sodium amide.

9. A process for the preparation of 4-ethanesulfonyl-4-(para-methoxyphenyl)-1-methylpiperidine which comprises heating para-methoxybenzyl ethyl sulfone with N,N-bis(beta-chloroethyl)-N-methylamine in the presence of sodium amide.

10. A process for the preparation of 4-ethanesulfonyl-4-phenyl-1-methylpiperidine which comprises heating ethyl benzyl sulfone with N,N-bis(beta-chloroethyl)-N-methylamine in the presence of sodium amide.

References Cited in the file of this patent
FOREIGN PATENTS
735,866   Germany _____ June 11, 1943

OTHER REFERENCES
Buchi et al.: Helv. Chim. Acta, vol. 35, pp. 1527–36, June 6, 1952.